2,980,627
Patented Apr. 18, 1961

2,980,627

ELECTRO-LUMINESCENT ZINC SULFIDE IODIDE FLUXED PHOSPHORS, AND METHOD FOR THEIR PREPARATION

Frank Evans Swindells, Maplewood, N.J., assignor to E. I. du Pont de Nemours and Company, Wilmington, Del., a corporation of Delaware No Drawing. Filed Sept. 17, 1958, Ser. No. 761,486

9 Claims. (Cl. 252—301.6)

This invention relates to a novel bright blue-emitting electroluminescent phosphor and to a method for its preparation.

I have now discovered a new electroluminescent phosphor made from a critical combination of ingredients and prepared in a critical manner, which phosphors are significantly and surprisingly outstanding in physical properties, particularly in brightness of electroluminescent emission and in color stability upon exposure to changes in excitation frequency.

The product of this invention, therefore, is a bright blue-emitting electroluminescent phosphor comprising zinc sulfide activated by one of the following: (1) copper in an amount of 0.0065 to 0.65%, (2) copper in an amount of 0.0065 to 0.65% with coactivating arsenic in an amount of 0.0075 to 7.5%, or (3) copper in an amount of 0.0065 to 0.65% with coactivating lead in an amount of 0.0207 to 20.7%; and fluxed with at least one iodide compound selected from the group consisting of sodium iodide and potassium iodide, wherein the iodide compound is utilized in an amount of 0.3 to 6% in the case of (1) and in the amount of 0.3 to 3% in the cases of (2) and (3); the mixture having been fired at between about 850 and 1100° C. for from about 0.5 to 4 hours. In the above definition, all percents are by weight based on the weight of the zinc sulfide.

Phosphors according to this invention are characterized by an emission brightness at least 100%, and in preferred embodiments as great as 700%, that of compared prior art phosphors.

In the process of preparation according to this invention, the various components, including the zinc sulfide, together with the copper activator and optionally the arsenic or lead coactivator, and the prescribed amount of iodide flux, are admixed in water to form a dispersion. The dispersion is dried and the resultant mixture fired at a temperature within the prescribed range, and preferably at a temperature of about 950° C., for a length of time within the range from about 0.5 to 4 hours, and preferably about 1 hour for small batches. This firing preferably but not necessarily occurs in a zinc sulfide surround. With relatively large batches, longer firing times can be utilized effectively.

After firing, the product is allowed to cool and can then, if desired, be given one or more conventional phosphor after-firing treatments for enhancement of properties, including washing with hot water, dilute hot alkali metal cyanide, such as potassium or sodium cyanide, a water-soluble carboxylic acid, preferably a dilute hot acetic acid aqueous solution, and water, and drying the washed product. As will be understood, the product can be sieved to break up agglomerates and is then ready for use.

In a preferred preparation to make a preferred phosphor according to this invention, zinc sulfide is admixed with a suitable copper compound in an amount to provide from 0.0065 to 0.65%, and preferably about 0.033%, by weight of copper based on the weight of the zinc sulfide, a suitable arsenic compound in an amount sufficient to provide from 0.0075 to 7.5%, and preferably 0.077%, by weight of arsenic based on the weight of the zinc sulfide, and sodium iodide or potassium iodide, in an amount from 0.3 to 3%, and preferably 0.8% by weight of sodium iodide, plus water to form a dispersion. The resultant dispersion is dried and processed as described above.

In another preferred embodiment according to this invention, zinc sulfide is admixed with a suitable copper compound in an amount sufficient to provide from 0.0065 to 0.65%, and preferably about 0.033%, by weight of copper based on the weight of the zinc sulfide, a suitable lead compound in an amount to provide from 0.0207 to 20.7%, and preferably about 0.20%, by weight of lead based on the weight of the zinc sulfide, and sodium iodide or potassium iodide in an amount from 0.3 to 3%, and preferably 0.8% by weight of sodium iodide, plus water to form a dispersion. The resultant dispersion is dried and processed as described above.

In an alternative preparation, zinc sulfides admixed with a suitable copper compound, in an amount to provide from 0.0065 to 0.65%, and preferably about 0.33%, by weight of copper based on the weight of the zinc sulfide, together with sodium iodide or potassium iodide in an amount of from 0.3 to 6%, and preferably about 5% of sodium iodide, plus water to form a dispersion. The resultant dispersion is dried and processed as described above.

Suitable copper compounds useful for introducing the copper activator into the system include water-soluble copper compounds, preferably cupric acetate, but also divalent salts of copper such as the nitrate, carbonate, oxide and sulfate.

Suitable water-soluble arsenic compounds for introducing the arsenic coactivator into the system include arsenic trioxide, sodium arsenate, sodium arsenite, and preferably arsenic pentoxide.

Suitable lead compounds include such water-soluble materials as the nitrate, and preferably plumbous acetate.

While the calcining temperature range may vary from about 850° to 1100° C., it is preferred that when the flux utilized is sodium iodide, the calcining temperature be about 950° C. When the flux is potassium iodide, the preferred calcining temperature is about 1000° C.

While the preferred atmosphere for firing is a zinc sulfide surround, especially for small batches, an inert atmosphere such as nitrogen can also be used. If larger phosphor batches are prepared, the material can advantageously be placed in a silica tube, the open end of which is covered with a silica disc overlaid with a layer of previously fired zinc sulfide.

The cyanide solution used in the washing step in the preferred process is preferably of a concentration within the range of from 1 to 15%. Additional washes other than water washes to remove excess cyanide can be used if desired, but are not essential. The efficiency of the phosphors is improved, however, as a result of the decreased conductivity obtained, if after the cyanide wash the phosphors are washed with dilute, hot water-soluble carboxylic acid aqueous solution, e.g., formic, propionic, lactic and malic or preferably dilute hot acetic acid. The concentration of these acids is preferably within the range of from 1 to 25%.

The zinc sulfide utilized in this invention is preferably that prepared by the acid process described by H. W. Leverenz in "An Introduction to Luminescence of Solids," 474 (1950). All the starting materials are commercially available.

This invention will be more readily understood, but is not intended to be limited, by reference to the following examples, which are set forth for purposes of illustration only and in which percent by weight is biased on the zinc sulfide.

Example 1

To 730 g. of luminescence pure zinc sulfide was added 38 mls. of a 0.1 molar solution of cupric acetate (.033% copper by weight), 75 mls. of a 0.1 molar solution of arsensic pentoxide (.077% arsenic by weight), 38 mls. of a sodium iodide solution (15 g. sodium iodide/100 mls. water) (0.8% by weight), and enough distilled water to make a slurry. The mixture was stirred for 10 minutes and then dried in a drying oven overnight at 125° C. The resultant material was ball milled for 30 minutes and charged by packing tightly in a silica tube having one end closed. The open end of the silica tube was covered with a silica disc overlaid with a 1-inch layer of previously fired zinc sulfide. The material was calcined for 3 hours at 950° C. in a furnace which had been preheated to that temperature after which it was removed from the hot furnace and allowed to cool. The contents were removed from the silica tube, inspected under ultraviolet light illumination, and the inert material present removed. The resultant product was crushed in a mortar, ball milled again, and washed successively with 100 mls. each of the following solutions: two hot water, one hot 1.5% aqueous potassium cyanide solution, two cold water, and two boiling water. The product was collected on a fritted glass filter, sucked dry, finished in a drying oven at 100° C. and run through a screen of 200 mesh.

A test was made to determine the brightness of the phosphor when excited to electroluminescence. A cell was prepared by mixing 0.5 g. of the phosphor with 1.9 mls. of a urea formaldehyde (2 parts by weight)-alkyd resin (1 part by weight), which is a clear, thermosetting, furniture finish, spreading the mixture on a piece of transparent, electroconductive glass which had a masked-out area where one electrical contact was made, and drying in an oven for 30 minutes at 90° C. (prior to drying in the oven, the tape masking out the electrical contact area was removed). The resultant cell had 15 mgs. of phosphor per square centimeter and a dry thickness of 8 mils. A silver electrode was then painted on the phosphor surface using silver paint keeping at least ⅛ inch from the edges, and the cell again baked at 90° C. but for 10 minutes. Measurements were made of the light output at an applied field of 1000 cycles and 180 volts/mil. A brightness of 43 foot-lamberts was obtained, indicating excellent brightness.

Example 2

To 29.2 g. luminescence pure zinc sulfide previously described was added 1.5 mls. of a 0.1 molar solution of cupric acetate (.033% copper by weight), 3 mls. of a 0.1 molar solution of sodium arsenate (.077% arsenic by weight), 1.56 mls. of a sodium iodide solution described in Example 1 (0.8% by weight), and enough distilled water to make a slurry. The mixture was stirred for about ten minutes and then dried in a drying oven overnight at 125° C. The resultant material was ground in a mortar, charged by packing tightly in a silica crucible just large enough to contain the material, covered, placed inside a larger crucible which was then filled with previously fired zinc sulfide and covered. The crucible was placed in a furnace preheated to 950° C. and calcined for 1 hour at 950° C., after which it was removed from the hot furnace and allowed to cool. The inner crucible was then removed and its contents inspected under ultraviolet light illumination, removing the small amount of inert material from the surface. The resultant product was crushed in a mortar and washed successively with 100 mls. each of the following solutions: two hot water, one 1.5% aqueous potassium cyanide solution and two cold water. The product was collected, dried, and run through a mesh screen as described in Example 1. The phosphor was tested for brightness as described in Example 1; a brightness of 32 foot-lamberts was obtained.

Example 3

Example 2 was repeated except that 1.56 mls. of potassium iodide flux (15% solution) (0.8% by weight) was added as the flux in place of the sodium iodide flux described therein and the mixture calcined for 1 hour at 1000° C. The phosphor was tested as described in Example 1; a brightness of 26 foot-lamberts was obtained.

Example 4

The procedure of Example 2 was repeated except that the slurry was prepared from 15 mls. of 0.1 molar cupric acetate (0.33% by weight), 9.7 mls. sodium iodide flux (15% solution) (5% by weight), 29.2 g. zinc sulfide previously described, and distilled water. The mixture was calcined at 950° C. for 1 hour. The phosphor was tested as described in Example 1; a brightness of 11.8 foot-lamberts was obtained.

Example 5

Example 4 was repeated except that the sodium iodide flux was replaced by 9.7 mls. of potassium iodide flux (15% solution) (5% by weight) and the mixture was calcined for 1 hour at 1000° C. The phosphor was tested as described in Example 1; a brightness of 22 foot-lamberts was obtained.

Example 6

Example 2 was repeated except that the slurry was comprised of 12.6 mls. of 0.1 molar cupric acetate (0.033% by weight), 25 mls. of 0.1 molar plumbous acetate (0.214% by weight), 16 mls. sodium iodide flux (15% solution) (1% by weight), 242.5 g. zinc sulfide previously described, and distilled water. The mixture was calcined for 2 hours at 925° C. in the furnace in a nitrogen atmosphere rather than the zinc sulfide surround previously described, in and out cold. The phosphor was tested as described in Example 1; a brightness of 18 foot-lamberts was obtained.

The luminescent materials prepared according to the invention are suitable for use in electroluminescent devices of known kind, and are particularly suitable for incorporation in an electroluminescent lamp like that described in Mager U. S. Patent 2,566,349 and in an X-ray image intensifier of the type described in White U.S. Patent 2,650,310. The product is also useful in the manufacture of illuminated dials, markers and indicators; advertising devices, dark room lighting; two-dimensional television screens; light amplifiers, storage devices for digital computers; radar screens; electro-optical energy convertors; and for reproduction of self-luminous halftones. In addition, the phosphors may be used with a phosphor of complementary color to form a white blend where it is desired that a white emission be obtained.

The deep blue-emitting phosphors with an emission peak of 4500 A. are brighter than known phosphors prepared by prior art methods, and yet their color stability remains good with changes of excitation frequency.

I claim:

1. A bright blue-emitting electroluminescent phosphor consisting essentially of zinc sulfide activated by materials selected from the three following groups: (1) copper in an amount of 0.0065 to 0.65%, (2) copper in an amount of 0.0065 to 0.65% with coactivating arsenic in an amount of 0.0075 to 7.5%, and (3) copper in an amount of 0.0065 to 0.65% with coactivating lead in an amount of 0.0207 to 20.7%; and fluxed with at least one iodide compound selected from the group consisting of sodium iodide and potassium iodide, wherein the iodide compound is in an amount of 0.3 to 6% in the case of (1) and in the amount of 0.3 to 3% in the cases of (2) and (3); the mixture having been fired at between about 850 and 1100° C. for from about 0.5 to 4 hours, the only halide present during the firing being said iodide compound, wherein all percents are percent by weight based on the weight of the zinc sulfide.

2. An electroluminescent phosphor consisting essentially of zinc sulfide activated by copper in an amount of 0.0065 to 0.65% and fluxed with from 0.3 to 6% of at least one iodide compound selected from the group consisting of sodium iodide and potassium iodide, the mixture having been fired at between about 850 and 1100° C. for from about 0.5 to 4 hours, the only halide present during the firing being said iodide compound, wherein all percents are percent by weight based on the weight of the zinc sulfide.

3. An electroluminescent phosphor consisting essentially of zinc sulfide activated by copper in an amount of 0.0065 to 0.65% with coactivating arsenic in an amount of 0.0075 to 7.5%, and fluxed with from 0.3 to 3% of at least one iodide compound selected from the group consisting of sodium iodide and potassium iodide, the mixture having been fired at between about 850 and 1100° C. for from about 0.5 to 4 hours, the only halide present during the firing being said iodide compound, wherein all percents are percent by weight based on the weight of the zinc sulfide.

4. An electroluminescent phosphor consisting essentially of zinc sulfide activated by copper in an amount of 0.0065 to 0.65% with coactivating lead in an amount of 0.0207 to 20.7%, and fluxed with from 0.3 to 3% of at least one iodide compound selected from the group consisting of sodium iodide and potassium iodide, the mixture having been fired at between about 850 and 1100° C. for from about 0.5 to 4 hours, the only halide present during the firing being said iodide compound, wherein all percents are percent by weight based on the weight of the zinc sulfide.

5. In the process of preparing a bright blue-emitting electroluminescent phosphor, the combination of steps comprising admixing zinc sulfide and material selected from the following three groups: (1) a water-soluble copper compound sufficient to provide copper in an amount of 0.0065 to 0.65%, (2) copper in an amount of 0.0065 to 0.65% with a water-soluble arsenic compound sufficient to provide arsenic in an amount of 0.0075 to 7.5%, and (3) a water-soluble copper compound sufficient to provide copper in an amount of 0.0065 to 0.65% with a water-soluble lead compound sufficient to provide lead in an amount of 0.0207 to 20.7%; together with at least one iodide compound selected from the group consisting of sodium iodide and potassium iodide, wherein the iodide compound is in an amount of 0.3 to 6% in the case of (1) and in the amount of 0.3 to 3% in the cases of (2) and (3); in water to form a dispersion, drying said dispersion, and firing the dried product at a temperature within the range from about 850 to 1100° C. for from about 0.5 to 4 hours, the only halide present during the firing being said iodide compound, all percents being percent by weight based on the weight of the zinc sulfide.

6. The process as set forth in claim 5 wherein said copper compound is cupric acetate.

7. The process as set forth in claim 5 wherein said arsenic compound is arsenic pentoxide.

8. The process as set forth in claim 5 wherein said lead compound is plumbous acetate.

9. The process as set forth in claim 5 wherein said fired and dried phosphor is given an after-treatment of a rinse with a 1 to 15% aqueous cyanide solution.

References Cited in the file of this patent

UNITED STATES PATENTS

| | | |
|---|---|---|
| 2,571,905 | Longini | Oct. 16, 1951 |
| 2,802,792 | Butler | Aug. 13, 1957 |
| 2,847,386 | Mazo | Aug. 12, 1958 |
| 2,874,128 | Wachtel | Feb. 17, 1959 |

FOREIGN PATENTS

| | | |
|---|---|---|
| 788,978 | Great Britain | Jan. 8, 1958 |

OTHER REFERENCES

Kroeger: "The Blue Luminescence of Zinc Sulfide," J. Electro. Chem. Soc., vol. 93, May 1948, pages 156–171.

Petrillo: "Method of Prep. Small-Particle ZnS Electro-Phosphor," R.C.A. Technical Notes, pub. by R.C.A., Princeton, N.J., R.C.A. TN No. 162, page 1, August 18, 1958.